United States Patent Office 2,720,827
Patented Oct. 18, 1955

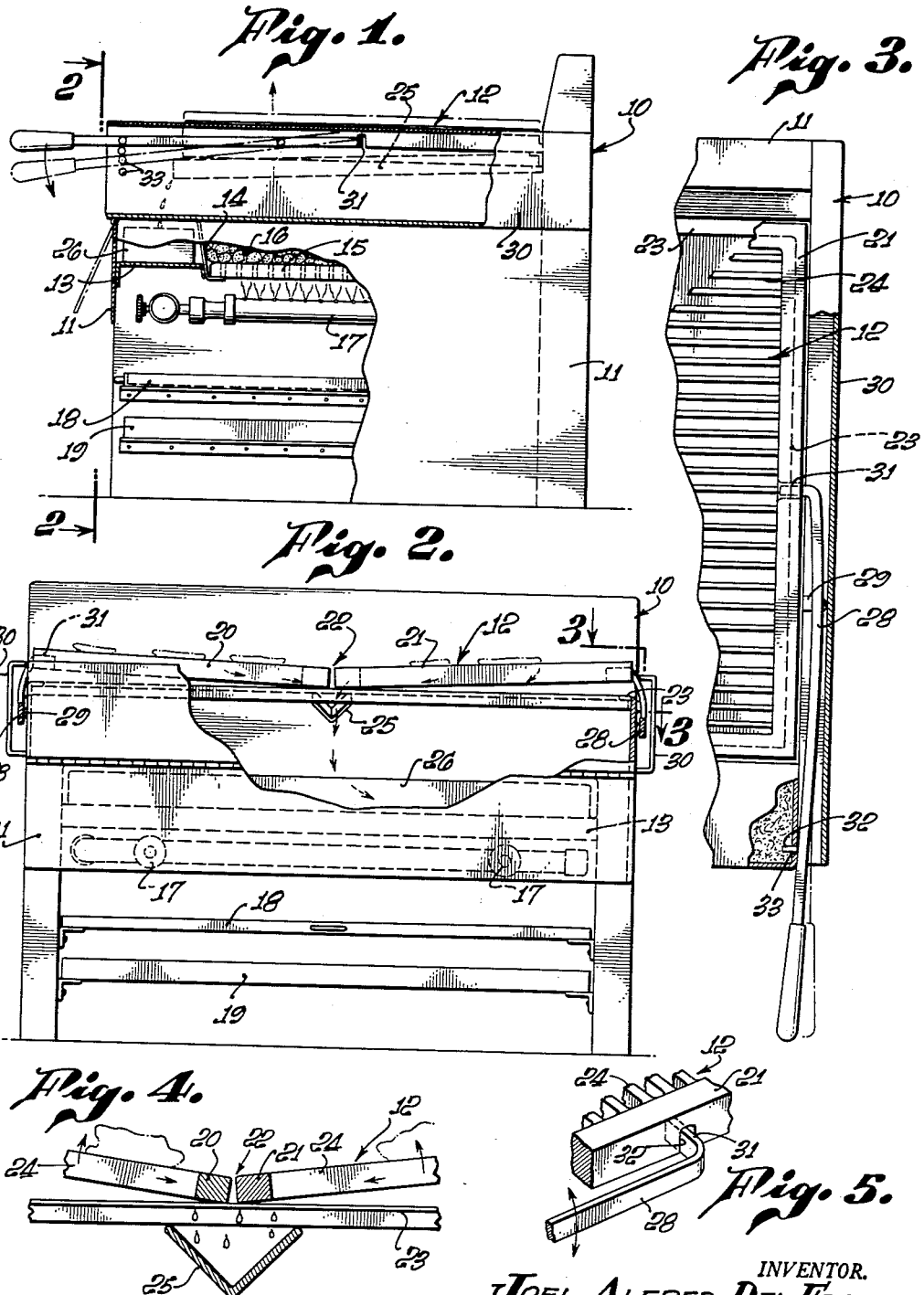

2,720,827

BROILER

Joel Alfred Del Francia, Alhambra, Calif.

Application November 20, 1952, Serial No. 321,705

12 Claims. (Cl. 99—444)

This invention has to do generally with improvements in cooking broilers of the general type comprising a firebox structure containing or supporting a grip upon which foods, and particularly meats, are to be cooked. The invention is more particularly concerned with the grid portion of the broiler and with the elimination of certain cooking difficulties commonly encountered by reason of the limitations of the usual grids.

One of my major objects is to obviate the hazards, inconveniences and cooking delays occasioned by the drippage of grease from the grid into the firebox below. As is frequently experienced, grease from foods such as steaks, chops and the like may be released from the meat in such amounts that upon dripping into the fire below the grid, the grease will increase the flame intensity to the height that the meat will be set afire. Ordinarily the cook will endeavor to arrest burning of the food by such expedients as withdrawal of the grid from over the fire, snuffing out of the food blaze, or by dampening of the fire below as by water spray. The difficulties and hazards thus encountered are known and obvious.

It has been observed that if the grease be removed directly from the grid continuously as it tends to accumulate thereon, these difficulties may be eliminated in that the fire below may remain at its normal intensity. In accordance with the invention this observation is given practical application by the use of a movable grid, and preferably a pair of grids in inner edge-to-edge relation, together with means for adjustably tilting the grid or grids so that any consequential hot grease received by the grid will drain to one side or edge thereof for collection and isolation from the firebox.

As will appear the grid control permits adjustment of the grid tilt or slope to various degrees, an additional feature of which is that the adjustment allows control of the quantity of grease that might be permitted to drip onto refractory bodies overlying the burners below. Thus while some of the grease may be drained away and isolated from the fire box, the remaining grease may be permitted to drip through the grids onto the hot refractory bodies and in this manner control the amount of fire and smoke (resulting from burning of the grease drippings) required to give to the meat a charcoal-like flavor.

Structurally and in its preferred form, the invention is embodied in a broiler including a pair of movable grids having spaced elongated bars or members extending transversely of the grids toward their adjacent inner edges, and means adjustable to tilt the grids toward their inner edges so that when inclined, the grids will carry the grease to a common collecting trough positioned beneath the drain edges. As a convenient and practical means for tilting and holding the grill in inclined positions, I use a pair of levers positioned and fulcrumed intermediate their ends at opposite sides of the grids, the latter being tiltable by upward movement of the levers against them and being retainable in their inclined positions by releasably holding the levers in their corresponding positions.

All the aforementioned features and objects of the invention, as well as the details of a typical and illustrative embodiment, will be understood fully from the following description of the accompanying drawing, in which:

Fig. 1 is a view showing the broiler in end elevation, a portion of the housing being broken away to reveal certain of the interior parts;

Fig. 2 is a front elevational view of Fig. 1, a portion of the housing again being broken away to illustrate more clearly the grid arrangement and grease collecting trough;

Fig. 3 is a fragmentary enlarged view taken on line 3—3 of Fig. 2;

Fig. 4 is a fragmentary enlargement of the inner drainage edges of the grids and collecting trough below; and Fig. 5 is a fragmentary perspective view showing the operating lever terminal engagement with the associated grid.

As illustrated in the drawing, the broiler may be described generally as comprising a firebox structure 10 which will be understood to include the sheet metal housing 11, and the firebox parts, and a pair of grids, generally indicated at 12, supported at the top of the housing and openly exposed for cooking access.

Referring to Figs. 1 and 2, the housing 11 contains sheet metal sections 13 and 14 which carry an apertured floor 15 upon which may be placed a mass 16 of refractory bodies in direct overlying relation to one or a plurality of gas burners 17. It is to be understood that the gas burner and refractory mass together may be regarded as constituting the firebox and that it is within the contemplation of the invention that any other suitable form of firebox, type or form of fuel may be used, so long as the heating medium is in direct underlying relation to the grid assembly 12. Directly below the burners the housing may contain a removable drip pan 18 and below the latter a bottom baffle 19. As illustrated in Fig. 2, the front of the housing may be open below the burners to permit air circulation upwardly through the broiler.

The grid assembly 12 is shown to comprise a pair of individual grids 20 and 21 having their inner sides placed edge-to-edge at 22 centrally of the housing, the grids being freely movable and supportable flatly in horizontal position on the rectangular housing frame flange 23. Each of the grids is shown to be formed of elongated spaced members such as bars or rods 24 extending transversely of the grids toward their inner edges at 22. The housing structure contains directly beneath the inner edges of the grids a trough 25 inclined toward the front of the broiler as illustrated in Fig. 1, the lower open end of the trough overlying a removable receptacle 26 contained within the housing and supported on the sheet member 13.

Referring particularly to Figs. 3 and 5, the grids are individually adjustable and retainable in inwardly inclined positions by a pair of levers 28 pivoted or fulcrumed at 29 intermediate their ends and each contained within a channel closure 30 which is applied to and may be regarded as a portion of the firebox housing structure. Each lever projects forwardly out of its channel 30 and has an inner turned end 31 received within a notch 32 in the outer edge of the grid. Thus the lever may be operated to raise and lower the associated grid between horizontality and such degree of inclination as may be desired. Each lever is releasable in any one of selected positions of adjustment as by providing the lever with a projection 32 receivable within any of the openings 33 in the sheet metal side 11 of the housing. The lever preferably is made of metal and longitudinally bowed, see Fig. 3, to cause the projection 32 to enter and remain in a selected opening 33. The lever is releasable by resiliently deflecting it outwardly to the broken line position appearing in Fig. 3.

In considering the operation of the broiler from the standpoint of preventing the drippage of grease from the grids in sufficient amounts to cause excessive flaming from the firebox, before or as soon as such occurrence is noted, levers 28 may be operated and adjusted to tilt and hold the grids in their illustrated positions sloping toward the trough 25. It is found that as grease from the meat being cooked is released onto the grids, the hot grease will flow along the members 24 to the inner edges of the grids at 22 and drip into the trough 25, through which the grease passes into the receptacle 26. Thus by simple tilting adjustment of the grids, it is possible to preclude such drippage from the grids as will disturb the fire below.

I claim:

1. A broiler comprising a stationary housing containing a firebox structure, a pair of movable cooking grids supported by the housing in inner edge-to-edge relation above the firebox, said grids comprising elongated spaced members extending transversely of the grids toward their inner edges, adjustable means for tilting and holding the grids inclined toward their inner edges, and means for collecting the drained grease at said inner edges.

2. A broiler comprising a stationary housing containing a firebox structure, a pair of movable cooking grids supported by the housing above the firebox in inner edge-to-edge relation, said grids comprising elongated spaced members extending transversely of the grids toward their inner edges, adjustable means for tilting and holding the grids inclined toward their inner edges, and a trough underlying said inner edges of the grids for collecting the drained grease.

3. A broiler comprising a stationary housing containing a firebox structure, a pair of movable cooking grids supported by the housing above the firebox in inner edge-to-edge relation, said grids comprising elongated spaced members extending transversely of the grids toward their inner edges, adjustable means for selectively tilting and holding the grids inclined toward their inner edges, a trough underlying said inner edges of the grids for collecting the drained grease, and a receptacle within said housing for receiving grease from said trough.

4. A broiler comprising a stationary housing containing a firebox structure, a pair of movable cooking grids supported by the housing above the firebox in inner edge-to-edge relation, said grids comprising elongated spaced members extending transversely of the grids toward their inner edges, adjustable means movable upwardly against the opposite outer edge positions of the grids for selectively tilting and holding the grids inclined toward their inner edges, and means for collecting the drained grease at said inner edges.

5. A broiler comprising a stationary housing containing a firebox structure, a pair of movable cooking grids supported by the housing above the firebox in inner edge-to-edge relation, said grids comprising elongated spaced members extending transversely of the grids toward their inner edges, separate and independently adjustable means movable upwardly against the opposite outer edge portions of the grids for tilting and holding the grids inclined toward their inner edges, and means for collecting the drained grease at said inner edges.

6. A broiler comprising a stationary housing containing a firebox structure, a pair of movable cooking grids supported by the housing above the firebox in inner edge-to-edge relation, said grids comprising elongated spaced members extending transversely of the grids toward their inner edges, separately adjustable levers fulcrumed intermediate their ends on the housing and movable upwardly against the outer opposite edge portions of the grids for tilting and holding the grids inclined toward their inner edges, and means for collecting the drained grease at said inner edges.

7. A broiler comprising a stationary housing containing a firebox structure, a pair of movable cooking grids supported by the housing above the firebox in inner edge-to-edge relation, said grids comprising elongated spaced members extending transversely of the grids toward their inner edges, a pair of levers extending along the sides of the firebox structure and manually operable at the front thereof, means fulcruming said levers intermediate their ends on the housing, the inner ends of the levers being movable upwardly against the opposite outer side portions of the grids to tilt and incline the grids toward their inner edges, means for holding said levers in different positions of adjustment, and a trough underlying the inner edges of the grids for collecting the drained grease.

8. A broiler as defined in claim 7, in which said levers and housing structure have interfitting projections and openings to maintain the levers in correspondingly set positions.

9. A broiler as defined in claim 7, in which said levers are made of longitudinally curved metal and the levers and housing have projections and openings interfitted by virtue of the lever curvatures to hold the levers in corresponding positions, said projections being releasable from the openings by flexure of the levers.

10. An integrated portable broiler comprising an upstanding housing structure including four closed sidewalls and at an upper elevation a stationary grid support, a transverse assembly of stationary gas burners contained within a lower portion of the housing, a tiltable cooking grid overlying said burners and supported by said grid support, said grid comprising openly spaced members between which gases from the burners pass upwardly through the grid, said housing structure extending as high as the grid, control means interposed between the grid and housing and including a handle for tilting the grid and means for stationarily holding the grid at different positions relative to said stationary housing walls, and refractory bodies directly overlying the burners below the grid and between which the burner gases flow before reaching the grid.

11. A broiler as defined by claim 10, in which said control means extends from inside the housing outwardly through an opening in a sidewall thereof.

12. A broiler as defined by claim 10, in which one side of the grid is stationarily supported and said handle extends from the opposite side of the grid and is selectively engageable within vertically succeeding recesses in the stationary housing structure.

References Cited in the file of this patent

UNITED STATES PATENTS

| 387,609 | Vogel | Aug. 7, 1888 |
| 615,548 | Guinean | Dec. 6, 1898 |
| 842,695 | Peters | Jan. 29, 1907 |
| 1,006,746 | Glass | Oct. 24, 1911 |
| 1,452,907 | Campbell | Apr. 24, 1923 |
| 2,101,967 | Walterspiel | Dec. 14, 1937 |

FOREIGN PATENTS

| 3,969 | Great Britain | Feb. 21, 1896 |
| 14,030 | Great Britain | July 23, 1895 |